(12) United States Patent
Lancaster

(10) Patent No.: US 7,225,368 B2
(45) Date of Patent: May 29, 2007

(54) EFFICIENT REAL-TIME ANALYSIS METHOD OF ERROR LOGS FOR AUTONOMOUS SYSTEMS

(75) Inventor: Peter Connley Lancaster, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 544 days.

(21) Appl. No.: 10/825,023

(22) Filed: Apr. 15, 2004

(65) Prior Publication Data

US 2005/0246590 A1    Nov. 3, 2005

(51) Int. Cl.
*G06F 11/00* (2006.01)
(52) U.S. Cl. .......................... 714/48; 714/47
(58) Field of Classification Search ................. 714/47, 714/48
See application file for complete search history.

(56) References Cited

U.S. PATENT DOCUMENTS

| | | | |
|---|---|---|---|
| 3,704,363 A | 11/1972 | Salmassy et al. | |
| 4,964,129 A | 10/1990 | Bowden, III et al. | |
| 4,979,059 A | 12/1990 | Sengoku | |
| 5,463,768 A | 10/1995 | Cuddihy et al. | |
| 5,500,940 A | 3/1996 | Skeie | |
| 5,761,411 A * | 6/1998 | Teague et al. ............... | 714/47 |
| 6,006,016 A * | 12/1999 | Faigon et al. ............... | 714/48 |
| 6,148,415 A | 11/2000 | Kobayashi et al. | |
| 6,338,151 B1 * | 1/2002 | Yudenfriend et al. .......... | 714/47 |
| 6,345,322 B1 | 2/2002 | Humphrey | |
| 6,513,129 B1 * | 1/2003 | Tentij et al. .................. | 714/4 |
| 6,625,589 B1 | 9/2003 | Varma et al. | |
| 6,684,265 B2 * | 1/2004 | Graf ........................... | 710/18 |
| 7,036,049 B2 * | 4/2006 | Ali et al. ...................... | 714/47 |
| 2003/0070115 A1 | 4/2003 | Nguyen et al. | |
| 2003/0074607 A1 | 4/2003 | Brundridge et al. | |

FOREIGN PATENT DOCUMENTS

| | | |
|---|---|---|
| EP | 0 517 403 A2 | 12/1992 |
| JP | 63-027940 A | 2/1988 |
| JP | 2002-215431 A | 8/2002 |
| JP | 2002-312205 A | 10/2002 |

OTHER PUBLICATIONS

IBM Technical Disclosure Bulletin, "Error Recording Architecture," Jul. 1980, pp. 763-766.
IBM Technical Disclosure Bulletin, "Method for Improved Diagnostic Fault Isolation of intermittent Multiple Bit Failures in an Interleaved Memory Design," Mar. 1987, p. 4645-4646.

* cited by examiner

*Primary Examiner*—Michael Maskulinski
(74) *Attorney, Agent, or Firm*—Quarles & Brady LLP

(57) ABSTRACT

An error logging and analysis system is used to detect a type of error condition, assign a numeric value corresponding to the severity of the error condition, record the time of the error condition, and determine the frequency between subsequent error conditions of the same type. A weighted error rate is generated as a function of the severity of the initial error condition, the frequency of subsequent error conditions, and a percentage of any preceding weighted error rates. These weighted error rates are compared to a predetermined threshold to determine if the error condition is statistically significant.

26 Claims, 2 Drawing Sheets

EFFICIENT REAL-TIME ANALYSIS METHOD OF ERROR LOGS FOR AUTONOMOUS SYSTEMS

BACKGROUND OF THE INVENTION

1. Field of the Invention

This invention is related in general to the field of data storage systems. In particular, the invention consists of a pattern analysis method used to dynamically detect errors and generate weighted numeric values.

2. Description of the Prior Art

Error logs are generated by systems such as mechanical systems, computer systems, and information systems in response to system faults or anomalous conditions. These systems often include an error logging and analysis component ("ELA") to log the error, analyze the failure, and initiate mitigating action in real-time. Systems that experience repetitive errors may utilize analysis techniques to recognize error patterns.

Data storage systems such as computer hard disk drives, redundant arrays of independent/inexpensive disks ("RAIDs"), or structured random access memory ("RAM") can benefit from error pattern analysis to determine the source of repetitive errors or to predict system failure. However, error pattern analysis traditionally has been difficult to implement in complex systems. Real-time pattern analysis has generally been limited by space (required to store error messages), processing resources, and the amount of time required to detect and analyze error patterns.

Newer ELA components utilize time-based methods to determine if a fault is statistically relevant. A common technique is to sum the number of fault events of a particular type over a time interval and compare this to a predetermined threshold. These time-based methods are relatively simple and effective in overcoming the problems of storage-space, processing resources, and time. However, time-based methods are not efficient when used in complex software/hardware systems because they do not effectively detect problems that develop over large periods of time. This can potentially result in an unexpected loss of a resource or catastrophic system failure. Additionally, time-based ELA systems have difficulty managing errors that occur in clusters, i.e., large numbers of errors over a small period of time interspersed with long error-free periods.

In U.S. Pat. No. 5,463,768, Paul Cuddihy et al. disclose an error log analysis system comprising a diagnostic unit and a training unit wherein the training unit includes a plurality of historical error logs. Sections of error logs that are in common with other historical error logs are identified and labeled as blocks. Each block is then weighted with a numerical value that is indicative of its value in diagnosing a fault. However, this system does not assign error weights to individual error instances. Additionally, proper implementation of this system requires that error analysis be order or time dependent.

In U.S. Pat. No. 6,625,589, Anil Varma et al. disclose an algorithm for improving the probability of identifying a repair that will correct a fault utilizing a historical fault log and calculating the number of times a fault occurs in a given period of time. Faults which occur with a frequency greater than the average are considered statistically significant. However, weights are not assigned to individual errors to assist the fault analysis process. Accordingly, it would be advantageous to have an error logging system that utilizes error severity and occurrence to generate a weighted error rate. Additionally, it would be beneficial to compare these weighted error rates to a predetermined threshold to assist in predicting component failure.

SUMMARY OF THE INVENTION

The invention disclosed herein is an error logging system that utilizes a weighted frequency-based approach to error analysis. The weight of common types of errors is computed in real time by computing the frequency and severity of these errors.

One aspect of this invention is the assignment of an initial error severity weight to an initial occurrence of a fault. When a like error subsequently occurs, the time period between the two faults is used to generate an error frequency factor. This error frequency factor is added to the initial error severity weight to produce a weighted error rate. When additional like errors occur, new weighted error rates are produced by summing the initial error severity weight, the new error frequency factor, and a percentage of the prior weighted error rate. The resulting weighted error rate is then compared to a predetermined threshold to determine if the fault is statistically significant.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

Figure 1:
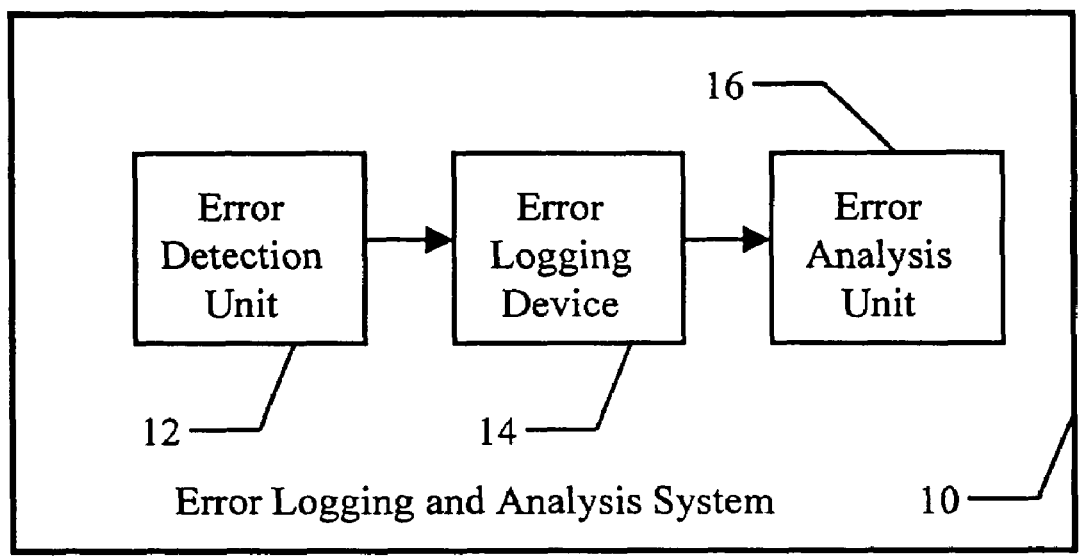
FIG. 1 is a schematic diagram of an error logging and analysis device in accordance with the invention including an error detection unit, an error logging device, and an error analysis unit.

This invention is based on the idea of using an error logging and analysis ("ELA") device to detect errors, assign weighted error rates to these errors, and compare the weighted error rates to predetermined thresholds. Referring to the figures, wherein like parts are designated with the same reference numerals and symbols, FIG. 1 is a schematic illustration of an ELA system 10 including an error detection unit 12, an error logging device 14, and an error analysis unit 16. The ELA system 10 may be implemented in almost any system using real-time logging and analysis such as mechanical systems, information systems, and computer systems.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Optical storage devices may include compact-disk read-only memory devices (CD-ROMs) or other types of optical disks. Volatile and non-volatile memory devices include programmable read-only memory (PROM), erasable read-only memory (EPROM), electrically-erasable programmable read-only memory (EEPROM), random-access memory (RAM), static random-access memory (SRAM), dynamic random-access memory (DRAM), magnetic disk drives, tape cartridges, and other types of data storage devices.

Algorithmic instructions that are placed into computer readable media are retrieved and implemented by the processing device. These algorithmic instructions may be accessed through any transmission media that can accommodate the transmission and reception of digital data such as local area networks (LANs), wide area networks (WANS), wireless networks, or the Internet. Those skilled in the art will recognize that modifications may be made to the configurations set forth below without departing from the scope of the present invention, and that the article of manufacture may comprise any medium capable of storing digital information.

Figure 2:
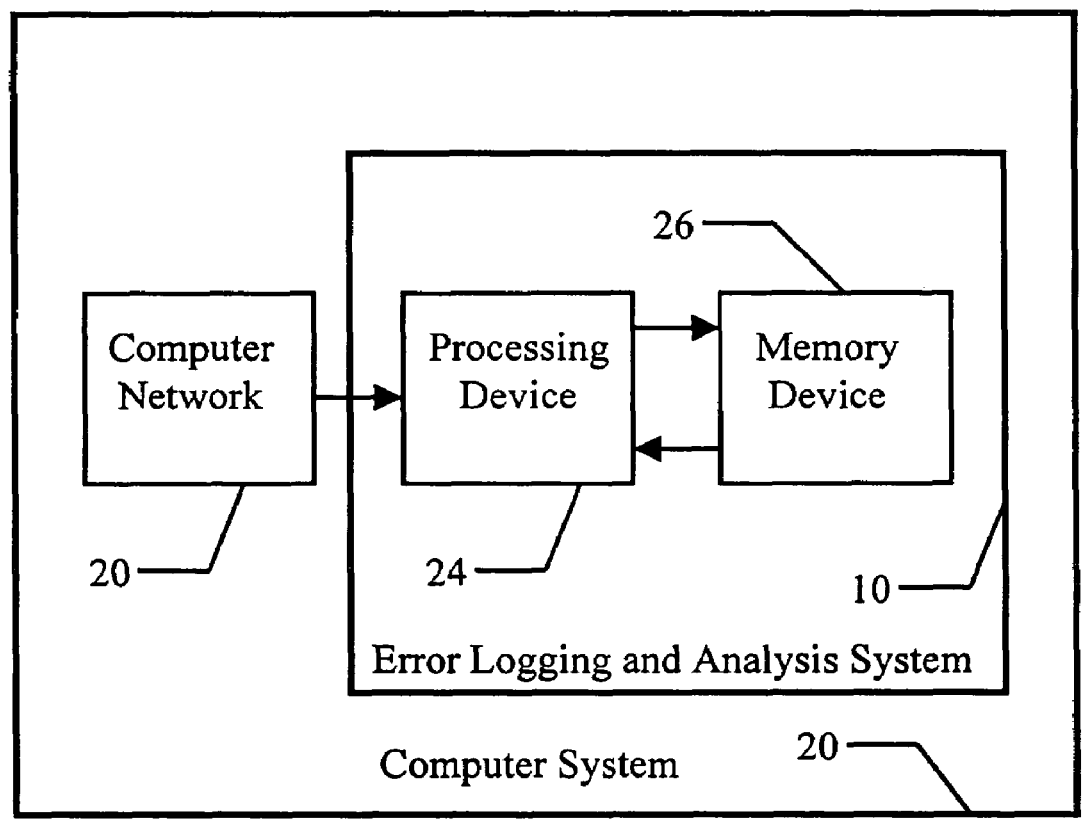
FIG. 2 is a schematic diagram of one embodiment of the error logging and analysis device of FIG. 1, wherein the error logging device is a digital storage device and the analysis unit is a computer processor.

One embodiment of the invention is illustrated in the schematic drawing of FIG. 2. In a computer system 20, an ELA system 10 is connected to a computer network 22. A processing device 24 acts as both the error detection unit 12 and the error analysis unit 16. This processing device 24 may be a field-programmable gate array ("FPGA"), a complex programmable-logic device ("CPLD"), an application-specific integrated circuit ("ASIC"), a general purpose processor ("CPU"), a micro-processor, or other similar computer processing device. A memory device 26, such as a random access memory ("RAM") integrated circuit, is used to store information about error conditions.

Figure 3:
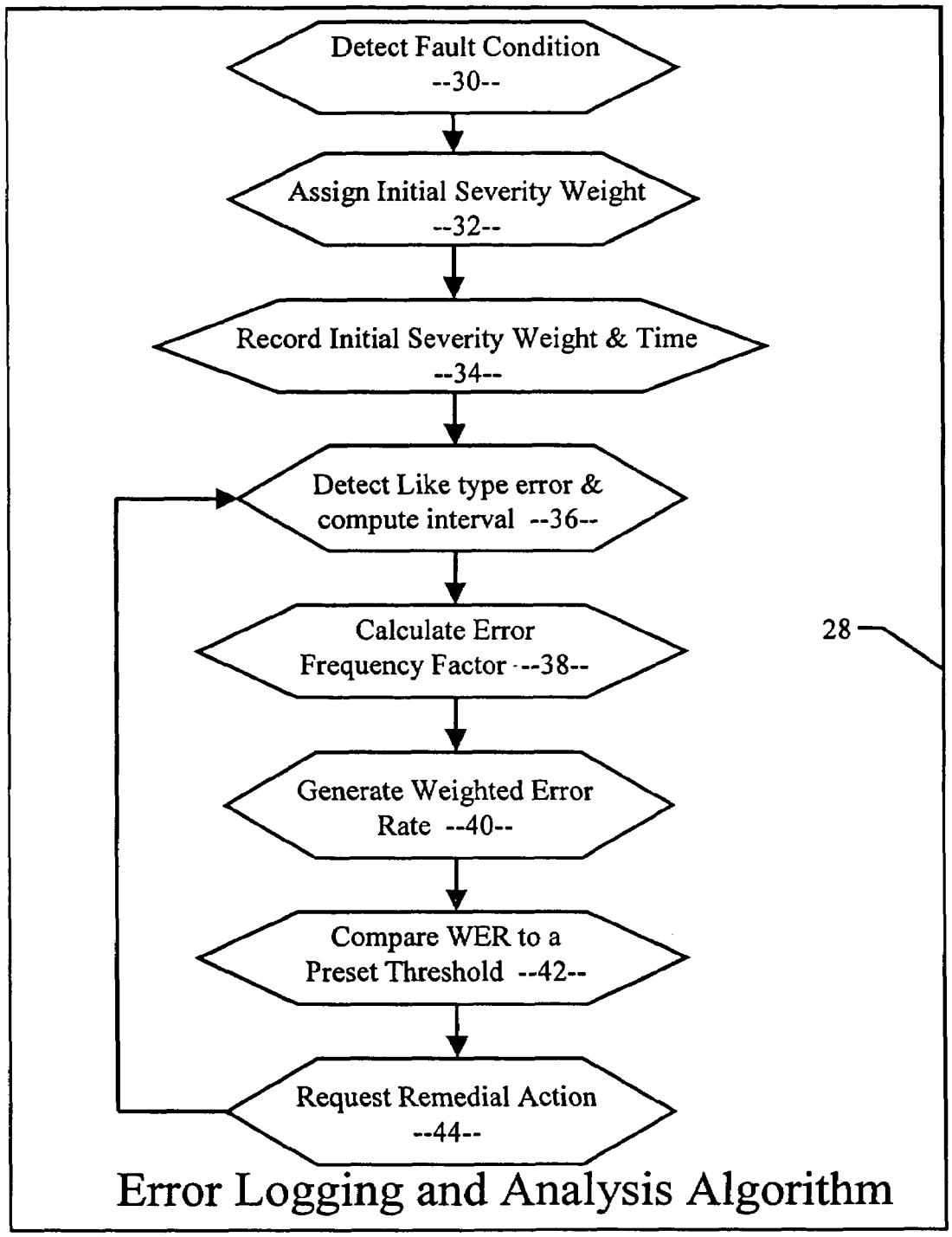
FIG. 3 is a flow-chart illustrating the process of detecting fault conditions, storing information related to the fault conditions, analyzing the severity and frequency of like fault conditions, assigning a weighted error rate to like fault conditions, comparing the resulting weighted error rate to a predetermined threshold, and ascertaining if the common fault conditions are statistically significant.

FIG. 3 is a flow-chart illustrating the process of analyzing fault conditions, utilizing an error logging and analysis algorithm 28. This algorithm may be implemented as either a hardware construct or a software application. In step 30, the processing device 24 monitors the computer network 22, actively listening for error messages. When a new type of error message is detected, the processing device 24 assigns an initial severity weight ("ISW") to the error message in step 32. In this embodiment of the invention, this initial severity weight is proportional to the potential impact this type of error may have in creating a failure of the computer system 20. The initial severity weight and the time the error condition occurred is recorded to the memory device 26 in step 34.

In step 36, when a subsequent error of a like type is detected, the processing device 24 determines the time interval between the initial error and the new error. Based on this time interval, the processing device 24 calculates an error frequency factor ("EFF") in step 38. In this embodiment of the invention, this error frequency factor is inversely proportional to a predetermined base number representative of a period of time such as a minute, a day, a month, or a year. Accordingly, the smaller the intervening time period, the greater the error frequency factor. This error frequency factor is added to the initial error severity weight to generate a weighted error rate WER in step 40:

$$WER = ISW + EFF.$$

In step 42, the weighted error rate is compared to a predetermined threshold. If the weighted error rate exceeds the predetermined threshold, the processing device labels the current error message as statistically significant and requests remedial action in step 44. This request for remedial action may be in the form of an alert message displayed on a computer screen, an email sent to a user, or a text document sent to a printer. When subsequent like types of error messages are detected, the process returns to step 36. Additionally, step 40 is modified to include a trend factor ("TF") designed to indicate a percentage of the previous weighted error rate. For example, $$\text{New } WER = ISW + EFF + (TF) \times (\text{Old } WER).$$

Those skilled in the art of making error analysis and logging systems may develop other embodiments of the present invention. For example, separate processing devices may be used as the error detection unit and the error analysis unit. Additionally, the invention can be implemented with a processing device containing a memory device utilized for error logging.

The terms and expressions which have been employed in the foregoing specification are used herein as terms of description and not of limitation, and there is no intention in the use of such terms and expressions of excluding equivalents of the features shown and described or portions thereof, it being recognized that the scope of the invention is defined and limited only by the claims which follow. Other embodiments of the invention may be implemented by those skilled in the art of error detection.

I claim:

1. An error logging and analysis system, comprising:
   an error detection unit;
   an error logging device; and
   an error analysis unit;
   wherein, within a period of time, the error detection unit is adapted to detect a first occurrence of a particular type of fault condition,
   the error detection unit is adapted to determine a first time of the first occurrence,
   the error detection unit is adapted to assign an initial error severity weight to the first occurrence,
   the error logging device is adapted to record the first time and the initial error severity weight,
   the error detection unit is adapted to detect a second occurrence of the particular type of fault condition,
   the error detection unit is adapted to determine a second time of the second occurrence,
   the error logging device is adapted to record the second time,
   the error analysis unit is adapted to determine a first interval between the first occurrence and the second occurrence,
   the error analysis unit is adapted to generate a first error frequency factor related to the first interval,
   the error analysis unit is adapted to generate a first weighted error rate that is a first function of the initial error severity weight and the first error frequency factor, the error logging device is adapted to subsequently record the first weighted error rate, the error detection unit is adapted to detect a third occurrence of the particular type of fault condition, the error detection unit is adapted to determine a third time corresponding to the third occurrence, the error logging device is adapted to record the third time, the error analysis unit is adapted to determine a second interval between the second occurrence and the third occurrence, the error analysis unit is adapted to generate a second error frequency factor related to the second interval, and the error analysis unit is adapted to generate a second weighted error rate that is a second function of the initial error severity weight, the second error frequency factor, and the first weighted error rate.

2. The error logging and analysis system of claim 1, wherein, within the same period of time, the error analysis unit is adapted to compare the first weighted error rate to a first predetermined threshold.

3. The error logging and analysis system of claim 2, wherein, if the first weighted error rate exceeds the first predetermined threshold, the error analysis unit is adapted to determine that the first weighted error rate is statistically significant.

4. The error logging and analysis system of claim 2, wherein the error logging device is adapted to record the second weighted error rate.

5. The error logging and analysis system of claim 1, wherein the error analysis unit is adapted to compare the second weighted error rate to a second predetermined threshold.

6. The error logging and analysis system of claim 5, wherein, if the second weighted error rate exceeds the second predetermined threshold, the error analysis unit is adapted to determine that the second weighted error rate is statistically significant.

7. An error logging and analysis system, comprising:
a processing device; and
a memory device;
wherein the processing device is adapted to detect a first occurrence of a particular type of fault condition,
the processing device is adapted to determine a first time of the first occurrence,
the processing device is adapted to assign an initial error severity weight to the first occurrence,
the memory device is adapted to record the first time and the initial error severity weight,
the processing device is adapted to detect a second occurrence of the particular type of fault condition,
the processing device is adapted to determine a second time of the second occurrence, the memory device is adapted to record the second time,
the processing device is adapted to determine a first interval between the first occurrence and the second occurrence,
the processing device is adapted to generate a first error frequency factor related to the first interval,
the processing device is adapted to generate a first weighted error rate that is a first function of the initial error severity weight and the first error frequency factor,
the memory device is adapted to record the first weighted error rate, the processing device is adapted to detect a third occurrence of the particular type of fault condition,
the processing device is adapted to determine a third time of the third occurrence,
the memory device is adapted to record the third time,
the processing device is adapted to determine a second interval between the second occurrence and the third occurrence,
the processing device is adapted to generate a second error frequency factor related to the second interval,
the processing device is edapted to generate a second weighted error rate that is a second function of the initial error severity weight, the second error frequency factor, and a percentage of the first weighted error rate.

8. The error logging and analysis system of claim 7, wherein the processing device is adapted to compare the first weighted error rate to a first predetermined threshold.

9. The error logging and analysis system of claim 8, wherein if the first weighted error rate exceeds the first predetermined threshold, the processing device is adapted to determine that the first weighted error rate is statistically significant.

10. The error logging and analysis system of claim 7, wherein the processing device is adapted to compare the second weighted error rate to a second predetermined threshold.

11. The error logging and analysis system of claim 10, wherein if the second weighted error rate exceeds the second predetermined threshold, the processing device is adapted to determine that the second weighted error rate is statistically significant.

12. The error logging and analysis system of claim 7, wherein the memory device is adapted to record the second weighted error rate.

13. The error logging and analysis system of claim 7, wherein said processing device is a computer processor.

14. The error logging and analysis system of claim 7, wherein said memory device is a random access memory integrated circuit.

15. A method of detecting, recording, and analyzing error conditions, comprising the steps of:
detecting a first occurrence of a particular type of fault condition;
determining a first time of the first occurrence;
assigning an initial error severity weight to the first occurrence;
recording the first time and the initial error severity weight;
detecting a second occurrence of the particular type of fault condition;
determining a second time of the second occurrence;
recording the second time;
determining a first interval between the first occurrence and the second occurrence;
generating a first error frequency factor related to the first interval;
generating a first weighted error rate that is a first function of the initial error severity weight and the first error frequency factor;
recording the first weighted error rate;
detecting a third occurrence of the particular type of fault condition;
determining a third time of the third occurrence;
recording the third time;
determining a second interval between the second occurrence and the third occurrence;

generating a second error frequency factor related to the second interval; and generating a second weighted error rate that is a second function of the initial error severity weight, the second error frequency factor, and a percentage of the first weighted error rate.

16. The method of claim 15, further comprising the step of comparing the first weighted error rate to a first predetermined threshold.

17. The method of claim 16, further comprising the step of determining whether the first weighted error rate is statistically significant.

18. The method of claim 15, further comprising the step of comparing the second weighted error rate to a second predetermined threshold.

19. The method of claim 18, further comprising the step of determining that the second weighted error rate is statistically significant.

20. The method of claim 15, further comprising the step of recording the second weighted error rate.

21. An article of manufacture including a data storage medium that includes a collection of machine-readable instructions that are executable by a processing device to implement an algorithm, said algorithm comprising the steps of:

detecting a first occurrence of a particular type of fault condition;

determining a first time of the first occurrence;

assigning an initial error severity weight to the first occurrence;

recording the first time and the initial error severity weight;

detecting a second occurrence of the particular type of fault condition;

determining a second time of the second occurrence;

recording the second time;

determining a first interval between the first occurrence and the second occurrence;

generating a first error frequency factor related to the first interval;

generating a first weighted error rate that is a first function of the initial error severity weight and the first error frequency factor;

recording the first weighted error rate;

detecting a third occurrence of the particular type of fault condition;

determining a third time of the third occurrence;

recording the third time;

determining a second interval between the second occurrence and the third occurrence;

generating a second error frequency factor related to the second interval; and generating a second weighted error rate that is a second function of the initial error severity weight, the second error frequency factor, and a percentage of the first weighted error rate.

22. The article of manufacture of claim 21, further comprising the step of comparing the first weighted error rate to a first predetermined threshold.

23. The article of manufacture of claim 22, further comprising the step of determining whether the first weighted error rate is statistically significant.

24. The article of manufacture of claim 21, further comprising the step of comparing the second weighted error rate to a second predetermined threshold.

25. The article of manufacture of claim 24, further comprising the step of determining that the second weighted error rate is statistically significant.

26. The article of manufacture of claim 21, further comprising the step of recording the second weighted error rate.

* * * * *